US012555884B2

(12) United States Patent
Shih et al.

(10) Patent No.: US 12,555,884 B2
(45) Date of Patent: Feb. 17, 2026

(54) HEAT-DISSIPATING ANTENNA DEVICE

(71) Applicants: Inventec (Pudong) Technology Corporation, Shanghai (CN); INVENTEC CORPORATION, Taipei (TW)

(72) Inventors: Ming Hung Shih, Taipei (TW); Yuan-Chang Yang, Taipei (TW)

(73) Assignees: Inventec (Pudong) Technology Corporation, Shanghai (CN); INVENTEC CORPORATION, Taipei (TW)

( * ) Notice: Subject to any disclaimer, the term of this patent is extended or adjusted under 35 U.S.C. 154(b) by 829 days.

(21) Appl. No.: 17/931,136

(22) Filed: Sep. 12, 2022

(65) Prior Publication Data

US 2023/0291088 A1 Sep. 14, 2023

(30) Foreign Application Priority Data

Mar. 8, 2022 (CN) ......................... 202210220235.6

(51) Int. Cl.
*H01Q 1/02* (2006.01)
*H01Q 1/22* (2006.01)
*H01Q 21/29* (2006.01)
*H01Q 25/00* (2006.01)

(52) U.S. Cl.
CPC ............. *H01Q 1/02* (2013.01); *H01Q 1/2283* (2013.01); *H01Q 21/29* (2013.01); *H01Q 25/00* (2013.01)

(58) Field of Classification Search
CPC .......... H01Q 1/02; H01Q 21/28; H01Q 21/29; H01Q 25/00
See application file for complete search history.

(56) References Cited

U.S. PATENT DOCUMENTS

| | | | | |
|---|---|---|---|---|
| 11,646,242 B2 * | 5/2023 | Costa | H01L 21/56 257/796 |
| 2003/0052830 A1 * | 3/2003 | Ogawa | H01Q 1/002 343/720 |
| 2019/0191597 A1 * | 6/2019 | Han | H01Q 21/0087 |
| 2020/0052363 A1 * | 2/2020 | Yoo | H01Q 21/28 |
| 2021/0126351 A1 * | 4/2021 | Hou | H01Q 1/02 |
| 2021/0234250 A1 * | 7/2021 | Migliorino | H01Q 9/42 |
| 2022/0069476 A1 * | 3/2022 | Yoo | H01Q 1/246 |
| 2022/0115760 A1 * | 4/2022 | Ji | H01Q 1/246 |
| 2022/0140869 A1 * | 5/2022 | Ji | H01Q 3/40 375/262 |
| 2023/0021186 A1 * | 1/2023 | Kim | H05K 7/20318 |

(Continued)

FOREIGN PATENT DOCUMENTS

WO WO-2021127992 A1 * 7/2021 ............... H05K 7/20

*Primary Examiner* — Ab Salam Alkassim, Jr.
(74) *Attorney, Agent, or Firm* — CKC & Partners Co., LLC

(57) ABSTRACT

An antenna device includes a housing, a masking frame, and antennas. The housing includes a side wall, a bottom wall, a heat dissipation structure, and bumps. The side wall surrounds the heat dissipation structure. The bottom wall connects to an edge of the side wall and extends outwards relative to the side wall. Each one of the bumps is disposed on one of the side wall and the bottom wall. The masking frame is removably fastened on the housing and defines an accommodation space with the side wall and the bottom wall. The antennas are disposed in the accommodation space and covered by the masking frame. The bumps contact the antennas, respectively.

9 Claims, 4 Drawing Sheets

(56) References Cited

U.S. PATENT DOCUMENTS

| | | | | |
|---|---|---|---|---|
| 2023/0253695 | A1* | 8/2023 | Kim | H01Q 1/246 |
| 2023/0282978 | A1* | 9/2023 | Kim | H01Q 19/104<br>343/702 |
| 2023/0411995 | A1* | 12/2023 | Hsiao | H05K 7/20909 |
| 2024/0079755 | A1* | 3/2024 | Kim | H01Q 1/246 |
| 2024/0313431 | A1* | 9/2024 | Kim | H01Q 15/14 |
| 2024/0413517 | A1* | 12/2024 | Li | H01Q 1/526 |
| 2025/0105486 | A1* | 3/2025 | Chien | H01Q 9/0407 |

* cited by examiner

HEAT-DISSIPATING ANTENNA DEVICE

CROSS-REFERENCE TO RELATED APPLICATION

This application claims priority to China Application Serial Number 202210220235.6, filed Mar. 8, 2022, which is herein incorporated by reference in its entirety.

BACKGROUND

Field of Invention

The present invention relates to an antenna device.

Description of Related Art

One of the important parts of the automatic driving technology of electric vehicles of the future is related to the establishment of the sensor network. Under a well-established sensor network, the electric vehicles may decide its next step based on the signal sent by the sensor network. In advance technology techniques, the sensor network may be achieved by a 5G network. Through the setting up of an artificial intelligence box (AI box) of a 5G network on traffic signs, the electric vehicles may communicate with the adjacent AI box freely.

However, there does not exist an AI box designed for 5G antennas. The antennas for 5G networks are chip antennas, which generate heat during operation and require sufficient heat dissipation structures. Further, the 5G AI box may be installed in hot environments, which makes heat dissipation design an important element for the 5G AI box.

SUMMARY

An aspect of the present disclosure is related to an antenna device.

According to one embodiment of the present disclosure, an antenna device includes a housing, a masking frame, and multiple antennas. The housing has a first side wall, a bottom wall, a heat dissipation structure, and a plurality of bumps. The first side wall surrounds the heat dissipation structure. The bottom wall connects to an edge of the first side wall and extends outward relative to the first side wall. Each one of the bumps is located on one of the first side wall and the bottom wall. The masking frame removably located on the housing. The masking frame defines an accommodation space with the first side wall and the bottom wall. The antennas are located inside the accommodation space and covered by the masking frame. The bumps are connected to the antennas, respectively.

In an embodiment of the present disclosure, at least one of the bumps is located on the first side wall, and at least another one of the bumps is located on the bottom wall.

In an embodiment of the present disclosure, the heat dissipation structure is a cooling fin. The heat dissipation structure is partially surrounded by the masking frame.

In an embodiment of the present disclosure, the antennas are chip antennas. Each one of the antennas has a front side and a back side that are opposite to each other. The front sides of two of the antennas are facing different directions.

In an embodiment of the present disclosure, the back sides of the antennas are connected to the bumps respectively.

In an embodiment of the present disclosure, the antennas at least include a first antenna, a second antenna, a third antenna and a fourth antenna. The front side of the first antenna is facing a first direction. The front side of the second antenna is facing a second direction. The front side of the third antenna is facing a third direction. The front side of the fourth antenna is facing a fourth direction. The first direction and the second direction are perpendicular to each other. The second direction and the third direction are opposite to each other. The fourth direction is perpendicular to both the first direction and the second direction.

In an embodiment of the present disclosure, the masking frame has multiple recess portions that are recessed toward the antennas respectively. Each one of the recess portions has a bottom part.

In an embodiment of the present disclosure, the bottom part of one of the recess portions corresponds in location to one of the antennas. A distance between the bottom part and the front side of the corresponding antenna is smaller than or equal to 1 mm.

In an embodiment of the present disclosure, the bottom part of one of the recess portions corresponds in location to one of the antennas. An area of the bottom part is equal to or larger than an area of the front side of the corresponding antenna.

In an embodiment of the present disclosure, one of the recess portions has a plurality of second side walls that are connected to the bottom part. At least one of the second side walls is tilted relative to the bottom part.

In conclusion, in the antenna device of the present disclosure, chip antennas directly contact the bumps to conduct heat, such that the heat may be dissipated by the heat dissipation structure of the housing during the operation of the chip antenna, and thus maintain normal operation under a suitable temperature. In addition, to maintain the efficiency of heat dissipation, at the same time, the first side wall and the bottom wall of the housing offer a suitable accommodation space to fix the chip antennas (including the chip antennas and its circuit board) on the first side wall and the bottom wall of the housing. The antennas may be distributed on different surfaces of the first side wall and the bottom wall, and thus cover the maximum signal transmission and reception range. Moreover, the recess portions of the masking frame correspond in position to the antennas to therefore protect the antennas from damage caused by dust and objects, and at the same time maintain the transmission and reception range of the antennas.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
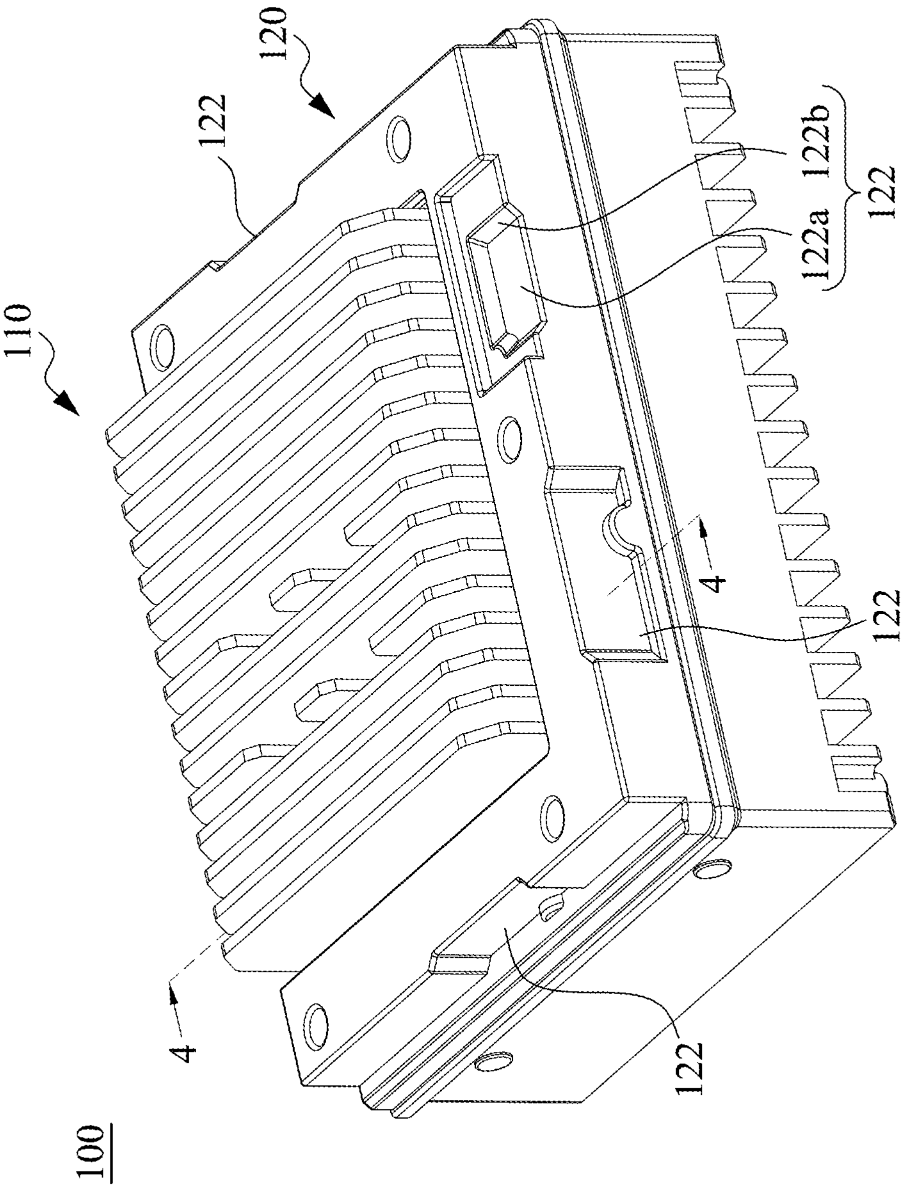
FIG. 1 schematically illustrates an antenna device, according to some embodiments of the present disclosure.

Reference will now be made in detail to the present embodiments of the invention, examples of which are illustrated in the accompanying drawings. Wherever possible, the same reference numbers are used in the drawings and the description to refer to the same or like parts.

Spatially relative terms, such as "beneath," "below," "lower," "above," "upper," "front," "back" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 2:
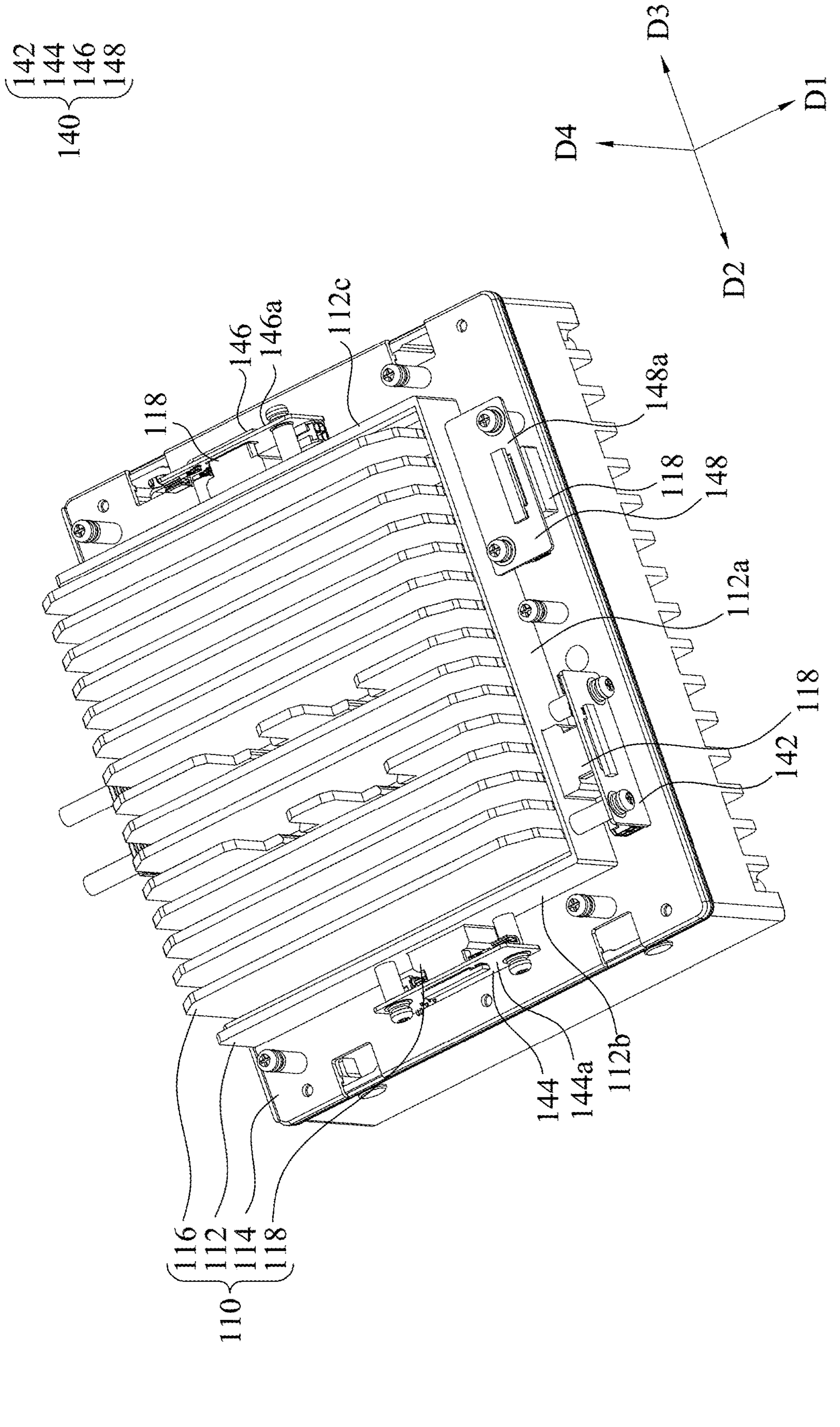
FIG. 2 schematically illustrates the antenna device in FIG. 1, in which a masking frame is removed.

FIG. 1 schematically illustrates an antenna device 100, according to some embodiments of the present disclosure. FIG. 2 schematically illustrates the antenna device 100 in FIG. 1, in which a masking frame 120 is removed. Referring to FIG. 1 and FIG. 2, according to one embodiment of the present disclosure, an antenna device 100 includes a housing 110, the masking frame 120, and multiple antennas 140. The housing 110 has a first side wall 112, a bottom wall 114, a heat dissipation structure 116, and a plurality of bumps 118. The first side wall 112 surrounds the heat dissipation structure 116. The bottom wall 114 connects to an edge of the first side wall 112 and extends outward relative to the first side wall 112. The bumps 118 are located on one of the first side wall 112 and the bottom wall 114. The masking frame 120 removably located on the housing 110. The masking frame 120 defines an accommodation space 130 with the first side wall 112 and the bottom wall 114 (see FIG. 4). The antennas 140 are located inside the accommodation space 130 and covered by the masking frame 120. The bumps 118 are connected to the antennas 140 respectively.

Moreover, the housing 110 may include multiple structures that can be combined, and the first side wall 112, the bottom wall 114, the heat dissipation structure 116 and the bumps 118 may be located on at least one of the structures. Referring to FIG. 2, in the embodiment shown in this drawing, the first side wall 112 is a continuous wall that surrounds the heat dissipation structure 116, but the present disclosure is not limited to such a configuration. In some other embodiments, the first side wall 112 may formed by multiple walls that are separated from each other. For example, the first side wall 112 may include three independent walls that are facing different directions, and these walls may surround the heat dissipation structure. Similarly, in the embodiment shown in FIG. 2, the bottom wall 114 that extends outward from the first side wall 112 may be formed by multiple extended structures that are separated from each other. With such a configuration, these extended structures would be connected to the first side wall 112 and extend outward from an edge of the first side wall 112. However, these extended structures would not be connected with each other, and further form multiple unconnected bottom walls 114 on multiple sides of the first side wall 112.

In some embodiments, the heat dissipation structure 116 is a cooling fin. The heat dissipation structure 116 is partially surrounded by the masking frame 120. Referring to FIG. 2, in the embodiment shown in this drawing, the heat dissipation structure 116 includes multiple cooling fins, and these fins are arranged in a cuboid shape. Three sides of the first side wall 112 surround the heat dissipation structure 116 and the bottom wall 114 extends outward from the first side wall 112. Referring to FIG. 1, after the masking frame 120 is fixed to the housing 110, the masking frame 120 covers the first side wall 112 and the bottom wall 114 and surrounds three sides of the heat dissipation structure 116. However, the present disclosure is not limited to such a configuration. Specifically, the area covered by the masking frame 120 is determined according to the locations of the antennas 140. In some other embodiments, only parts of the first side wall 112 and the bottom wall 114 are covered by the masking frame 120 while the masking frame 120 covers the antennas 140.

Figure 3B:
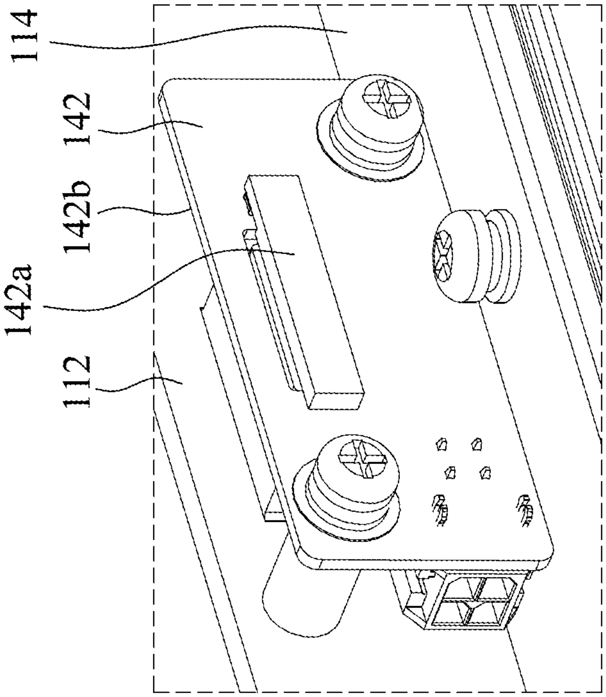
FIG. 3B schematically illustrates an enlarged view of a part of the antenna device in FIG. 2.
Figure 3A:
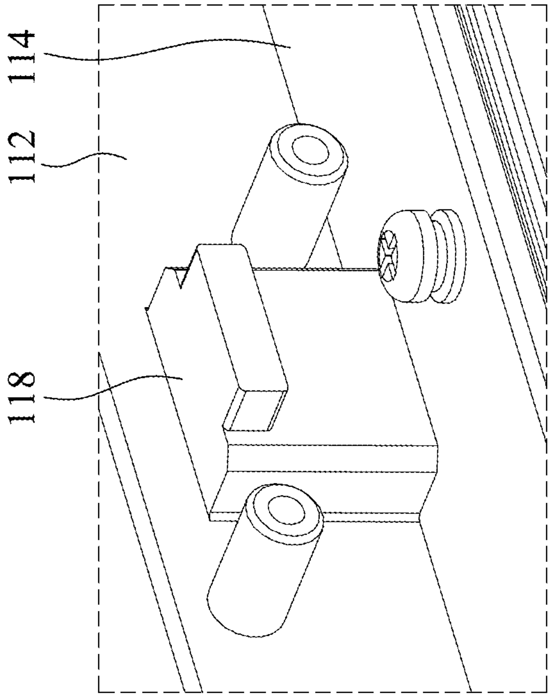
FIG. 3A schematically illustrates an enlarged view of a part of the antenna device in FIG. 2, in which antennas are removed.

FIG. 3A schematically illustrates an enlarged view of a part of the antenna device 100 in FIG. 2, in which the antennas 140 are removed. FIG. 3B schematically illustrates an enlarged view of a part of the antenna device 100 in FIG. 2. Referring to FIG. 2, FIG. 3A and FIG. 3B, the antennas 140 at least include a first antenna 142, a second antenna 144, a third antenna 146 and a fourth antenna 148. In some embodiments, the antennas 140 (e.g., the first antenna 142, the second antenna 144, the third antenna 146 and the fourth antenna 148) are chip antennas. Each one of the antennas 140 has a front side and a back side that are opposite to each other (e.g., the first antenna 142 has a front side 142*a* and a back side 142*b* in FIG. 3B). The front sides of any two of the antennas 140 face different directions. More specifically, in some embodiments, the front side 142*a* of the first antenna 142 is facing a first direction D1. A front side 144*a* of the second antenna 144 is facing a second direction D2. A front side 146*a* of the third antenna 146 is facing a third direction D3. A front side 148*a* of the fourth antenna 148 is facing a fourth direction D4. The first direction D1 and the second direction D2 are perpendicular to each other. The second direction D2 and the third direction D3 are opposite to each other. The fourth direction D4 is perpendicular to both the first direction D1 and the second direction D2. As a result of this configuration, the antennas 140 may have the largest possible signal sending and receiving range.

In FIG. 2, the first side wall 112 includes a first surface 112*a*, a second surface 112*b*, and a third surface 112*c*. Two sides of the first surface 112*a* are connected to the second surface 112*b* and the third surface 112*c*, respectively. The first antenna 142 is located on the first surface 112*a*, and the front side 142*a* of the first antenna 142 is facing the first direction D1. The second antenna 144 and the third antenna 146 are located on the second surface 112*b* and the third surface 112*c*, respectively, and the front side 144*a* and the front side 146*a* are respectively facing the second direction D2 and the third direction D3 that are opposite to each other. In some other embodiments, the second direction D2 and the third direction D3 may be two different directions that are not opposite. The fourth antenna 148 is located on the bottom wall 114. In the embodiment shown in FIG. 2, the fourth antenna 148 and the first antenna 142 are adjacent and the fourth antenna 148 is facing the fourth direction D4. However, the present disclosure is not limited to such a configuration. In other embodiments, the fourth antenna 148 may be adjacent to the second antenna 144 or the third antenna 146.

Referring to FIG. 2, in some embodiments, at least one of the bumps 118 is located on the first side wall 112, and at least another one of the bumps 118 is located on the bottom wall 114. Referring to FIG. 2, three bumps 118 are located on different surfaces of the first side wall 112, respectively, and one of the bumps 118 is located on the bottom wall 114, but the present disclosure is not limited to such a configuration. The location of the bumps 118 is related to the location of the antennas 140. Each bump 118 corresponds to at least one antenna 140, and is disposed on the housing 110 and contacts the antenna 140.

Moreover, in some embodiments, each of the surfaces of the antennas 140 (for example, the front side 142*a* or the back side 142*b* of the first antenna 142) is in contact with the bumps 118. For example, the back side 142*b* of the first antenna 142 is connected to the abutting surface of the bumps 118, but the present disclosure is not limited to such a configuration. In some other embodiments, the first antenna 142 may contact to the bump 118 with its front side 142*a* or other surfaces. The purpose of contacting the antennas 140 and the bumps 118 is to conduct the heat of the antennas 140 to the heat dissipation structure 116 through the bumps 118 during operation, and thus ensure that the antennas 140 operate normally under suitable temperatures.

Figure 4:
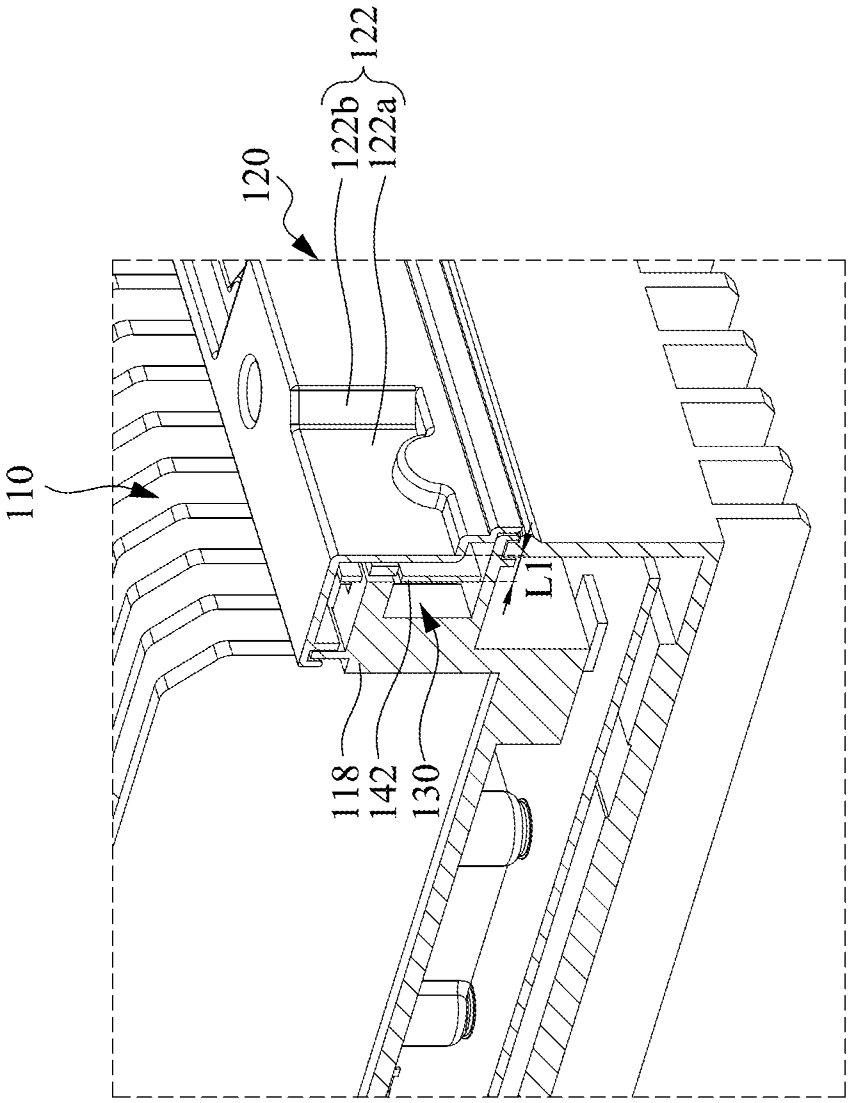
FIG. 4 schematically illustrates a sectional view of a part of the antenna device in FIG. 1 along line 4-4.

FIG. 4 schematically illustrates a sectional view of a part of the antenna device 100 in FIG. 1 along line 4-4. Referring to FIG. 1, FIG. 2, and FIG. 4, in some embodiments, the masking frame 120 has multiple recess portions 122, each recessed toward the antennas 140. Each one of the recess portions 122 has a bottom part 122*a*. Specifically, in some embodiments, one of the recess portions 122 has a bottom part 122*a* that corresponds in location to one of the antennas 140 (for example, the first antenna 142 in FIG. 4). Between the bottom part 122*a* and the front side of the corresponding antenna (for example, the front side 142*a* of the first antenna 142) there is a distance L1 that is smaller than or equal to 1 mm. The distance L1 may be decided by the characteristic of the first antenna 142, and different types of antennas may have different ranges for the distance L1. The operation efficiency of the antennas 140 is ensured by limiting the distance L1 between the antennas 140 and the bottom part 122*a*. In the embodiment shown in FIG. 4, if the distance L1 is larger than 1 mm, it will reduce the quality of sending and receiving signals. In some embodiments, the masking frame 120 is made by plastic materials, and as a result, the masking frame 120 may shelter the antennas 140 from dust or external objects while not affecting the signals of the antenna 140.

In some embodiments, one of the recess portions 122 has the bottom part 122*a* that is corresponding in position to one of the antennas 140 (for example, the first antenna 142 in FIG. 4). An area of the bottom part 122*a* is equal to or larger than an area of the front side of the corresponding antenna 140 (for example, the front side 142*a* of the first antenna 142). Generally, chip antennas may send and receive signals from a part of the area of its front side. The purpose to set the recess portion 122 on the masking frame 120 is to protect the antennas 140 from damage caused by dust or objects, and at the same time, avoid the effect to the signal of the antennas 140. In the embodiment shown in FIG. 4, the area of the bottom part 122*a* is equal to or larger than the area of the front side 142*a*, and as a result, signal attenuation of the first antenna 142 caused by the masking frame 120 may be reduced. If the area of the bottom part 122*a* is smaller than the area of the front side 142*a*, reception of signals by the first antenna 142 might be attenuated due to the thickness of the masking frame 120 or the distance L1 between the masking frame 120 and the first antenna 142.

In some embodiments, one of the recess portions 122 has the bottom part 122*a* and second side walls 122*b* that are connected to the bottom part 122*a*. At least one of the second side walls 122*b* is tilted relative to the bottom part 122*a*. Referring to FIG. 1 and FIG. 4, multiple second side walls 122*b* connect the recessed bottom part 122*a* with other parts of the masking frame 120. Specifically, the number of the second side walls 122*b* is not limited. For example, the bottom part 122*a* of the recess portion 122 which corresponds to the first antenna 142 has three second side walls 122*b* that are tilted relative to the bottom part 122*a*. The purpose of the second side walls 122*b* is to reduce signal attenuation caused by the cover of masking frame 120. By removing unnecessary parts of the masking frame 120, the signal attenuation caused by the cover of the masking frame 120 may be reduced. Hence, the design of other parts of the masking frame 120 must be considered when determining the number of the second side walls 122*b*. Further, the tilted angle between the second side walls 122*b* and the bottom part 122*a* may be adjusted according to the sending and receiving signal for different types of chip antennas, and the tilted angle is not limited to the angle shown in FIG. 1 and FIG. 4.

According to the above paragraphs, in the antenna device of the present disclosure, chip antennas directly contact the bumps to conduct heat, such that the heat may be dissipated by the heat dissipation structure of the housing during the operation of the chip antenna, and thus maintain normal operation under a suitable temperature. In addition, to maintain the efficiency of heat dissipation, at the same time, the first side wall and the bottom wall of the housing offer a suitable accommodation space to fix the chip antennas (including the chip antenna and its circuit board) on the first side wall and the bottom wall of the housing. The antennas may be distributed on different surfaces of the first side wall and the bottom wall, and thus cover the maximum signal transmission and reception range. Moreover, the recess portions of the masking frame correspond in position to the antennas to therefore protect the antennas from damage caused by dust and objects, and at the same time maintain the transmission and reception range of the antennas.

In one embodiment in the present disclosure, the present device may be used for artificial intelligence (AI) computing, edge computing, and also may be used for a 5G server, cloud server or car network server.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An antenna device, comprising:

a housing having a first side wall, a bottom wall, a heat dissipation structure, and a plurality of bumps, wherein the first side wall surrounds the heat dissipation structure, the bottom wall connects to an edge of the first side wall and extends outward relative to the first side wall, and each one of the bumps is disposed on one of the first side wall and the bottom wall, wherein at least one of the bumps is disposed on the first side wall, and at least another one of the bumps is disposed on the bottom wall;

a masking frame removably disposed on the housing, and defining an accommodation space with the first side wall and the bottom wall; and a plurality of antennas disposed inside the accommodation space and covered by the masking frame, wherein the bumps are connected to the antennas, respectively.

2. The antenna device of claim 1, wherein the heat dissipation structure is a cooling fin, and is partially surrounded by the masking frame.

3. The antenna device of claim 1, wherein the antennas are chip antennas, each one of the antennas has a front side and a back side that are opposite to each other, and the front sides of two of the antennas are facing different directions.

4. The antenna device of claim 3, wherein the back sides of the antennas are connected to the bumps respectively.

5. The antenna device of claim 3, wherein the antennas at least include a first antenna, a second antenna, a third antenna and a fourth antenna, the front side of the first antenna faces a first direction, the front side of the second antenna is facing a second direction, the front side of the third antenna is facing a third direction, and the front side of the fourth antenna is facing a fourth direction, wherein the first direction and the second direction are perpendicular to each other, the second direction and the third direction are opposite to each other, and the fourth direction is perpendicular to both the first direction and the second direction.

6. The antenna device of claim 3, wherein the masking frame has a plurality of recess portions that are recessed toward the antennas respectively, and each one of the recess portions has a bottom part.

7. The antenna device of claim 6, wherein the bottom part of one of the recess portions corresponds in location to one of the antennas, and a distance between the bottom part and the front side of the corresponding antenna is smaller than or equal to 1 mm.

8. The antenna device of claim 6, wherein the bottom part of one of the recess portions corresponds in location to one of the antennas, and an area of the bottom part is equal to or larger than an area of the front side of the corresponding antenna.

9. The antenna device of claim 6, wherein one of the recess portions has a plurality of second side walls that are connected to the bottom part, and at least one of the second side walls is tilted relative to the bottom part.

* * * * *